United States Patent
Ahn et al.

(12) 
(10) Patent No.: US 10,793,373 B2
(45) Date of Patent: Oct. 6, 2020

(54) SELF-CLEANING RING CONVEYOR

(71) Applicant: NIKE, Inc., Beaverton, OR (US)

(72) Inventors: HyunTae Ahn, Jung-Gu Seoul (KR); Hyun Min Baek, Jung-Gu Seoul (KR); Do Hyun Choi, Jung-Gu Seoul (KR); Sang Hee Lee, Jung-Gu Seoul (KR)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/270,386

(22) Filed: Feb. 7, 2019

(65) Prior Publication Data

US 2019/0248597 A1 Aug. 15, 2019

Related U.S. Application Data

(60) Provisional application No. 62/628,670, filed on Feb. 9, 2018.

(51) Int. Cl.
| | |
|---|---|
| *B65G 45/12* | (2006.01) |
| *B65G 45/10* | (2006.01) |
| *B65G 45/00* | (2006.01) |
| *B65G 15/10* | (2006.01) |
| *B05B 14/20* | (2018.01) |
| *B65G 15/30* | (2006.01) |
| *A43D 117/00* | (2006.01) |
| *A43D 25/18* | (2006.01) |

(52) U.S. Cl.
CPC ............. *B65G 45/12* (2013.01); *B05B 14/20* (2018.02); *B65G 15/105* (2013.01); *B65G 15/30* (2013.01); *A43D 25/183* (2013.01); *A43D 117/00* (2013.01); *B65G 2203/041* (2013.01)

(58) Field of Classification Search
None
See application file for complete search history.

(56) References Cited

U.S. PATENT DOCUMENTS

| 2,987,988 A | 6/1961 | Robledano | |
|---|---|---|---|
| 4,511,028 A * | 4/1985 | Meister | B65G 23/22 198/497 |
| 5,423,411 A * | 6/1995 | Kennett | B08B 7/0028 15/256.51 |

(Continued)

FOREIGN PATENT DOCUMENTS

EP 1260463 A2 11/2002

OTHER PUBLICATIONS

International Search Report and Written Opinion dated May 10, 2019 in International Patent Application No. PCT/US2019/017088, 15 pages.

*Primary Examiner* — Kavel Singh
(74) *Attorney, Agent, or Firm* — Shook, Hardy & Bacon L.L.P.

(57) ABSTRACT

A self-cleaning ring conveyor includes a first roller having a first rotational axis and a second roller having a second rotational axis that is parallel with the first rotational axis. The conveyor also includes a first ring extending around a combination of the first roller and the second roller and a second ring extending around the combination of the first roller and the second roller. The first ring and the second ring are parallel to each other. The conveyor also includes a first scraper having a first scraping slot and a second scraping slot. The first ring extends through the first scraping slot and the second ring extends through the second scraping slot.

20 Claims, 6 Drawing Sheets

(56) References Cited

U.S. PATENT DOCUMENTS

| | | | |
|---|---|---|---|
| 5,431,289 A | | 7/1995 | Hoffman |
| 5,432,411 A | * | 7/1995 | Beeteson .............. H01J 29/003 |
| | | | 315/370 |
| 8,141,695 B2 | * | 3/2012 | Kraus ................... B65G 43/00 |
| | | | 198/502.1 |
| 8,973,738 B2 | * | 3/2015 | Hilarides ............... B65G 45/10 |
| | | | 198/494 |
| 10,112,780 B2 | * | 10/2018 | Kovacs ................. B65G 45/10 |
| 2009/0013651 A1 | * | 1/2009 | Koga ..................... B65B 43/18 |
| | | | 53/455 |
| 2009/0139906 A1 | | 6/2009 | Kruyer |
| 2012/0272899 A1 | | 11/2012 | Makover et al. |
| 2013/0131854 A1 | | 5/2013 | Regan et al. |

* cited by examiner

SELF-CLEANING RING CONVEYOR

CROSS-REFERENCE TO RELATED APPLICATIONS

This application claims the benefit of priority of U.S. Application No. 62/628,670, titled "Self Cleaning Ring Conveyor," and filed Feb. 9, 2018. The entirety of the aforementioned application is incorporated by reference herein.

TECHNICAL FIELD

Directed to a self-cleaning conveyance mechanism.

BACKGROUND

Traditionally, a conveyance mechanism, such as a conveyor belt, is a sheet-like material or a mesh-like material having sufficient surface area to contact a component, such as a component of an article of footwear, along a path. The conveyance mechanism's sufficient surface area for contact provides support and frictional contact to effectively transport the component. A conveyance mechanism may be used to move a component through manufacturing processes, such as an application of a surface treatment. Surface treatments may be sprayed, poured, projected and the like at the component and, consequently, the conveyance mechanism transporting the component through the manufacturing process. As a result, residual material from the surface treatment may contaminate the movement mechanism.

BRIEF SUMMARY

Aspects hereof contemplate a self-cleaning ring conveyor. The conveyor includes a first roller having a first rotational axis and a second roller having a second rotational axis that is parallel with the first rotational axis. The conveyor also includes a first ring extending around a combination of the first roller and the second roller and a second ring extending around the combination of the first roller and the second roller. The first ring and the second ring are parallel to each other. The conveyor also includes a first scraper having a first scraping slot and a second scraping slot. The first ring extends through the first scraping slot and the second ring extends through the second scraping slot.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Conveyance mechanisms, such as a conveyor belt, are effective to convey an article, such as a component of an article of footwear, through a manufacturing process. The conveyance mechanism may transport the article from a first manufacturing process to another manufacturing process where the article is removed from the conveyance mechanism at one or more of the manufacturing processes. Additionally or alternatively, the conveyance mechanism may convey the article through a manufacturing process and therefore the conveyance mechanism is part of the manufacturing process being performed on the article. In this latter example, the conveyance mechanism may be subject to the manufacturing process being performed on the article. For example, in an exemplary aspect, a conveyance mechanism conveys an article through a surface treatment process where a material (e.g., adhesive, primer, colorant, cleaner, and the like) is applied to the article. The application of the material may be through a pouring, painting, spraying, submersion, and/or projecting process. The application of the material to the component also results in application of the material to the conveyance mechanism. It is this application of material to the conveyance mechanism that can result in residual material, a deposit of material on the conveyance mechanism, that contaminates the conveyance mechanism and can interfere with intended operation of the conveyance mechanism.

As a result of the residual material, cleaning of the conveyance mechanism may be performed. Failure to adequately clean the conveyance mechanism can result in undesired consequences. For example, the residual material may interfere with smooth movement of the conveyance mechanism, and, in some circumstances, prevent movement of the conveyance mechanism. Further, the residual material may transfer from the conveyance mechanism to a subsequent article positioned on the conveyance mechanism. The transferred residual material may contaminate the article and limit or prevent use of that article. A specific example, contemplates an article of footwear component, such as a footwear bottom unit (e.g., a shoe sole), that is transferred by a conveyance mechanism through an adhesive application process. The adhesive is applied to a foot-facing surface of the component while a ground-facing surface contacts the conveyance mechanism. The adhesive material is applied to the foot-facing surface as well as the conveyance mechanism surface, either intentionally or incidentally. The residual adhesive material that is applied to the conveyance mechanism is on at least an article-contacting surface (e.g., an exterior-facing surface) of the conveyance mechanism. As the conveyance mechanism subsequently conveys another article of footwear bottom unit, the ground-facing surface of the bottom unit may become contaminated with the residual adhesive material on the article-facing surface of the conveyance mechanism. This contamination may be limited through effective cleaning of the residual material and/or a reduction in conveyance mechanism material onto which the residual material may adhere.

A conventional conveyance mechanism may be formed from a sheet-like material or a mesh-like material. For example, a conveyor belt of the conveyance mechanism may be formed from an apertured (i.e., having holes through the material) or a non-apertured (e.g., solid) material. In both examples, there is transverse continuity of the conveyance material, which increases a surface area of the conveyor belt that is susceptible to increased residual material accumulation. As aspects herein contemplate, the conveyance mechanism may comprise a plurality of rings arranged in a longitudinally parallel orientation. Having discrete rings as a conveyance mechanism transport surface allows for a reduced surface area of the transport surface that is therefore less susceptible to residual material accumulation. In yet another aspect contemplated, the rings are an "O-ring" configuration having a circular transverse cross-section. A circular cross-section allows for a reduced residual material accumulation and a reduced surface area contact with the article that can contaminate an article relative to a flat-surfaces cross section, such as a rectilinear cross-section. Therefore, in an exemplary aspect, the O-ring implementation can reduce both the residual material accumulation and a reduced surface area in contact with the article to limit a transfer of the residual material to an article.

Figure 1:
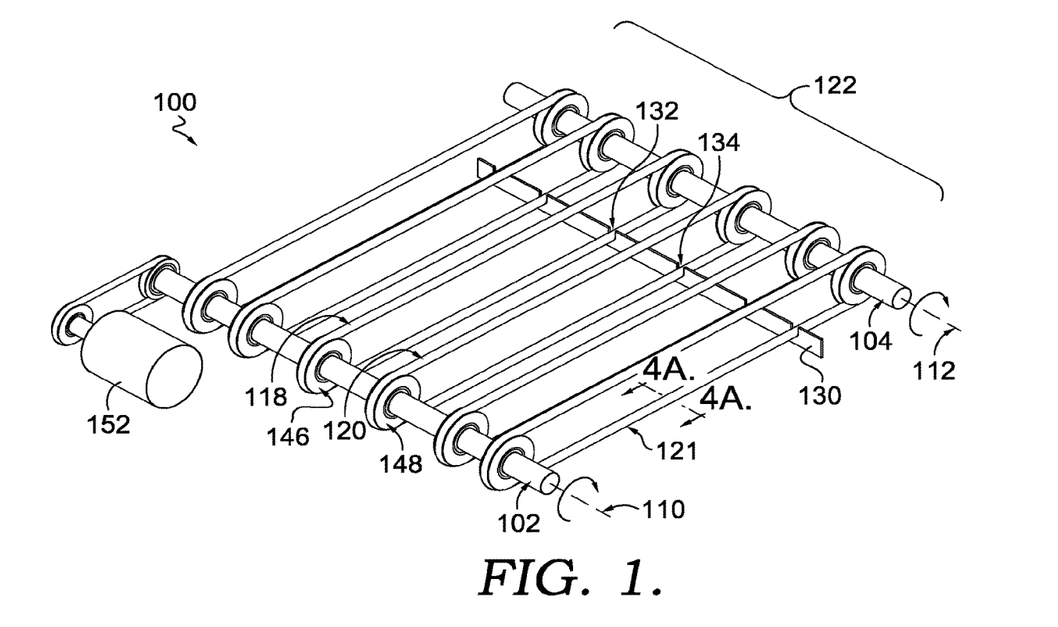
FIG. 1 depicts a perspective view of a ring conveyor having a scraper, in accordance with aspects hereof.

Turning to FIG. 1 illustrating a simplified self-cleaning ring conveyor 100, in accordance with aspects hereof. The conveyor 100 is comprised of a first roller 102 having a first rotational axis 110 and a second roller 104 having a second rotational axis 112 that is parallel with the first rotational axis 110. The conveyor 100 is also comprised of a first ring 118 extending around a combination of the first roller 102 and the second roller 104. The conveyor 100 is also comprised of a second ring 120 extending around the combination of the first roller 102 and the second roller 104. As depicted, the first ring 118 and the second ring 120 are parallel. The conveyor 100 is further comprised of a first scraper 130. The first scraper 130 having a first scraping slot 132 and a second scraping slot 134. The first ring 118 extends through the first scraping slot 132 and the second ring 120 extends through the second scraping slot 134.

The plurality of rings 122 may be formed from a variety of materials, such as elastomeric polymer compositions, non-elastomeric polymer compositions, metal, and the like. In an exemplary aspect, a ring is formed from a silicone-based material composition. Additional materials are contemplated, such as a polyurethane-based material composition, a polyester-based material composition, a nylon-based material composition, a steel material composition, a tungsten-based material composition, a composite of one or more compositions, and/or a multi-ply construction. However, as will be appreciated hereinafter, in some exemplary aspects, a silicone-based material composition provides sufficient component support while minimally interfering with an associated vision system and light source. Additionally, a silicone-based material composition for the rings may provide sufficient dry-cleaning properties by the one or more scrapers as a result of a low affinity for adhesion between the silicone-based material and the residual material (e.g., adhesive).

The conveyor 100 also includes a plurality of pulleys about which a plurality of rings 122 (e.g., the first ring 118, the second ring 120, a third ring 121) extend. A first pulley 146 is depicted on the first roller 102 with the first ring 118 extending there around. Similarly, a second pulley 148 is depicted on the first roller 102 with the second ring 120 extending there around. One or more pulleys are optional. In the alternative of a pulley, it is contemplated that a recessed portion of the roller may be formed to maintain a position of the ring on the roller. However, in an exemplary aspect, a pulley is positioned on the roller to reduce a transfer of residual material to the roller and other portions of the roller. Additionally, a pulley is contemplated to provide a ring position guide that maintains a relative position of a ring on the roller as the ring is rotated about a combination of rollers. A pulley may be any size and configuration. For example, the pulley may have a ring-receiving channel slightly larger in width, or the same in width, as a diameter of the ring. For example, if a 7 millimeter ("mm") diameter ring extends around a pulley, the pulley may have a receiving channel width about 7 mm (7.0, 7.05, 7.1, 7.15, 7.2, 7.3, 7.4 mm), in an exemplary aspect.

The conveyor 100 is also comprised of a drive source 152 that is operatively coupled with one or more of the rollers. For example, as depicted in FIG. 1, the drive source 152 is operatively couple by way of a belt to the first roller 102. However, as will be depicted in FIGS. 5-8 hereinafter, a common coupling 154 may operatively couple a plurality of rollers to a drive source, such as the drive source 152. The drive source may be an electric motor, a hydraulic motor and the like that are configured to provide a rotational energy to one or more rollers and/or rings of the conveyor. The drive source may be operatively coupled to the one or more rollers and/or rings by any means, such as a direct connection, a belt, a chain, ring, and the like.

The first scraper 130 is a residual material scraping element. The first scraper 130, and other scrapers provided herein, provide for a physical engagement with residual material to reduce or eliminate the residual material from a surface of one or more rings. A scraper may be formed from any material and any combination of material. For example, it is contemplated that a scraper may be formed from a first resilient material, such as metal, as well as from a second material, such as a polymer-based composition (e.g., rubber) with the second material at a residual contacting portion of the scraper and the first material secured to other elements of the device. In this example, the second material portion (e.g., a ring-contacting or residual material-contacting portion) may be replaced and mounted to the first material portion for easier servicing of the scraper. Further, it is contemplated that a different scraper material may be used depending on a location of the scraper in the conveyor and/or depending on the residual material or ring material. For example, it is contemplated that a first scraper or first plurality of scrapers may be formed from a first type of material effective to remove residual material at a macro level and a subsequent scraper or second plurality of scrapers may be formed from a second material type to clean a surface of the rings at a more micro level. Specifically, it is contemplated that the first scraper 130 is formed with a rubber-type material as a residual material-contacting surface to scrape and dislodge the residual material and a subsequent scraper (e.g., a third scraper 142 and a fourth scraper 144 of FIGS. 5-8) is formed with a polytetrafluoroethylene material composition as a residual material-contacting surface. The initial rubber-based scraper has an effective resilience and interaction with a ring to remove recently deposited residual material. The polytetrafluoroethylene material is effective to clean a surface of the ring(s) to limit future contamination of an article positioned on the ring(s). It is contemplated that any number of scrapers formed from any material(s) may be implemented in aspects hereof.

A scraper may have a residual material contacting portion that is linear (e.g., a straight edge) and that is effective to scrape or otherwise dislodge material from a single plane of the ring. Alternatively, it is contemplated that a scraper, such as the first scraper 130, may have one or more scraper slots (e.g., a non-linear edge) through which a ring passes. A scraper slot is effective to increase a surface area of the ring engaged by a scraper. For example, the first scraping slot 132 and the second scraping slot 134 are sized and shaped to engage with residual material on a complete or substantially complete first hemisphere of the ring cross section. Therefore, a single scraper is effective to clean residual material from a larger portion of the ring surface as compared to a linear edge. The scraper slots may be formed to have a shape and size that corresponds with the ring passing there through. For example, the first ring 118 has a circular cross section with a diameter of 4-10 mm (e.g., 4 mm, 5 mm, 6 mm, 7 mm, 8 mm, 9 mm, 10 mm, or any size there between) and the first scraping slot 132 may have a hemispherical slot opening having a similarly sized diameter to that of the ring. Alternatively, it is contemplated that the slot opening may be a slightly larger (e.g. 1%, 2%, 3%, 5%, 10%) width than that of the ring passing there through to limit wear on the ring by a constant contact with the scraper slot. In yet an additional alternative example, the slot opening may be slightly smaller (e.g. 1%, 2%, 3%, 5%, 10%) width than that of the ring passing there through to ensure sufficient interaction between the scraper and the ring to effectively remove residual material. It is contemplated that the ring and/or the scraper at the ring-contacting region (edge length in contact with the ring or residual material on the ring) may be resilient and/or compliant to allow for a smaller-sized slot than the ring, in an exemplary aspect. A scraping slot extends from a distal end of a scraper inwardly to an opposite end of the scraper. This creates a tooth-like structure at a distal end of the scraper for contacting and scraping one or more rings.

A scraper is positioned within a predefined distance of the ring(s). The distance, in part, determines an amount of residual material that is allowed to remain after an effective scraping. The distance is offset between a scraper and a ring is measured from the ring to a scraping surface effective to scrape residual material from the ring. For example, aspects contemplate a scraper positioned with 1 mm of a ring. In this example, a distance between the ring and a scraping surface or edge of the scraper is 1 mm or less. It is contemplated that the distance of separation between a scraper and a ring is 0.0 mm as the ring contacts the scraper. However, some aspects contemplate a clearance distance between a clean ring and a scraper to prevent scraper-induced wear on the ring as the ring moves past the scraper. If the scraper and the ring maintain contact, excessive wear may be experienced on the ring, in some aspects. If too much clearance is maintained, e.g., greater than 1 mm between the ring and the scraper, then an excessive amount of residual material may be allowed to accumulate on the ring. An excessive amount of residual material affects characteristics of the ring in operation, such as stiffness, movement, interference with vision system operation, light source interference, and/or the like. Therefore, a distance of 1 mm or less is contemplated in some aspects. In other aspects, the distance may be 0.1 mm, 0.2 mm, 0.3 mm, 0.4 mm, 0.5 mm, 0.6 mm, 0.7 mm, 0.8 mm, 0.9 mm, 1.1 mm, 1.2 mm, 1.3 mm, 1.4 mm, or 1.5 mm.

Figure 2:
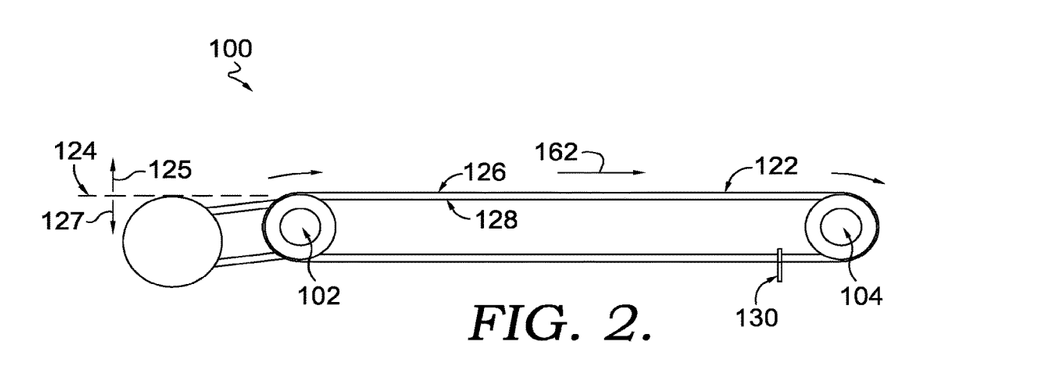
FIG. 2 depicts a side view of the ring conveyor of FIG. 1, in accordance with aspects hereof.

Turning to FIG. 2 depicting a side view of the conveyor 100 of FIG. 1, in accordance with aspects hereof. A plane 124 having a first side 125 and a second side 127 extends along a component-supporting surface of the plurality of rings 122. In practice, a component, such as a shoe bottom unit, is transported on the first side 125 of the plane 124 by the plurality of rings 122. Material is applied to the component as the component is supported by the plurality of rings 122. As a result, a portion of the ring(s) exposed to the first side 125 receive over application (e.g., over spray) of the material intended for the component. This surface of the ring(s) exposed to the over application of material is referred to as an exterior facing surface 126 and an opposite surface of the ring(s) is referred to as an interior facing surface 128. As it is contemplated that one or more rings may be circular in cross section, it is contemplated that a twisting may occur as the ring(s) transverse one or more of the rollers. As such, an exterior-facing portion of a ring may twist as the ring circumnavigates the rollers to become an interior-facing surface. Consequently, as will be depicted in FIGS. 5-8, aspects contemplate having scrapers at both an interior and an exterior position relative to the ring(s) for cleaning of the ring(s) regardless of potential twisting or residual material transfer.

A direction of travel 162 for the plurality of rings 122 is depicted in FIG. 2. As used herein, a direction of travel is reference to a traditional direction of rotation of the ring(s) as they circumnavigate a combination of rollers during a manufacturing process. The direction of travel 162 is reference, for example, when a relative order of scrapers is used in exemplary aspects. For example, as provided above, it is contemplated that a first type of scraper may be implemented prior in time to a second type of scraper. The first type of scraper may be effective to remove macro quantities of residual material while the second type of scraper may be effective to remove micro quantities of residual material. The first scraper type may therefore be positioned in the direction of travel 162 prior to the second type of scraper.

Figure 3:
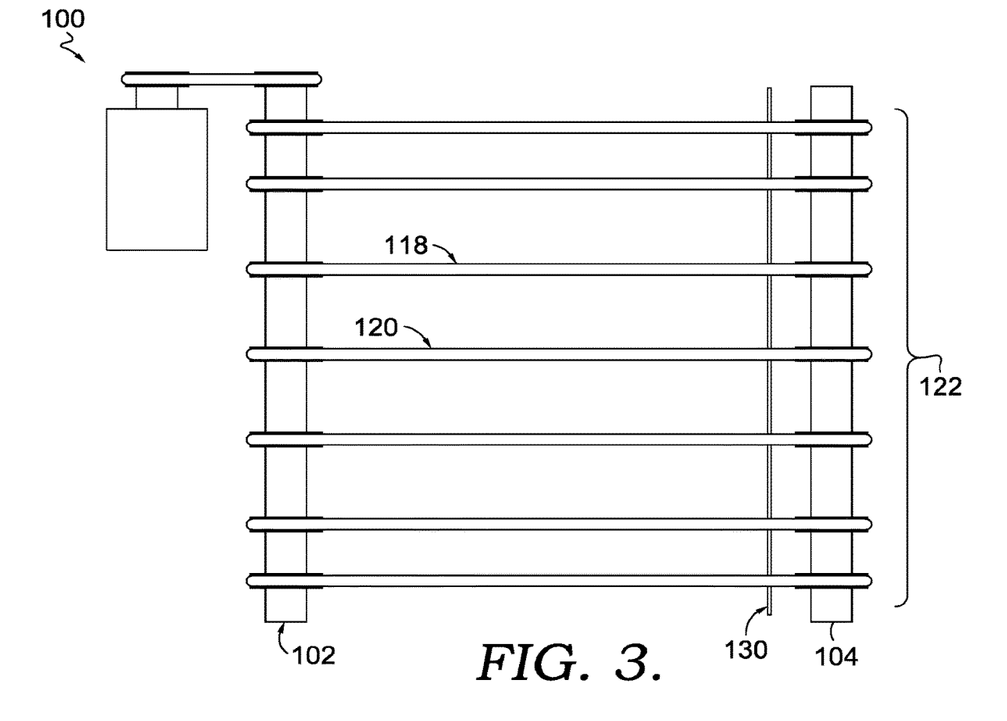
FIG. 3 depicts a top view of the ring conveyor of FIG. 1, in accordance with aspects hereof.

FIG. 3 depicts a top view of the conveyor 100 of FIG. 1, in accordance with aspects hereof. While the plurality of rings 122 provides for seven discrete rings, it is contemplated that any number of rings may be used in practice. Further, while a relative spacing is depicted between the parallel rings of the plurality of rings 122, it is understood that any spacing may be implemented to adequately support and convey an article. The first scraper 130 is depicted at a position subsequent to the second roller 104 and positioned to scrap and exterior surface of the plurality of rings 122; however, the position of the first scraper may be altered in exemplary aspects.

Figure 4A:
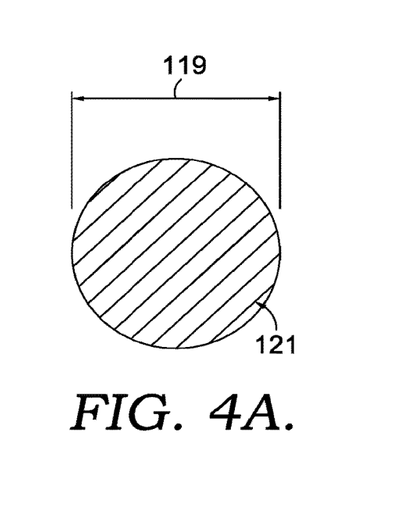
FIG. 4A depicts a cross section view of a ring, in accordance with aspects hereof.

FIG. 4A depicts a cross section of the third ring 121 from cut line 4A-4A of FIG. 1, in accordance with aspects hereof. The circular cross section of the third ring 121 is exemplary in nature. Alternative cross sections are contemplated, such as a triangle, quadrilateral, and/or an oblong (e.g., oval, rectangular) version thereof. A diameter 119 is depicted. As discussed previously, a width or diameter of the ring affects a surface area exposed to over application of material. The width also can affect the ring's ability to support and convey an article. The diameter 119 (or width) for conveying an article of footwear component contemplated herein (e.g., a shoe bottom unit) a diameter of a circular cross sectional ring formed from an elastomeric composition (e.g., silicone) may be between 4 and 10 mm. In an exemplary aspect, the diameter is between 6 and 8 mm. In a specific exemplary aspect, the ring has a diameter of about 7 mm. However, for other materials (e.g., metallic filaments), it is contemplated that the diameter may be less than 1 mm, such as 0.1 mm to 1 mm. It is also contemplated that as the diameter is reduced, an increase in the number of rings forming the plurality of rings 122 may be increased to sufficiently support and convey an article.

Figure 4B:
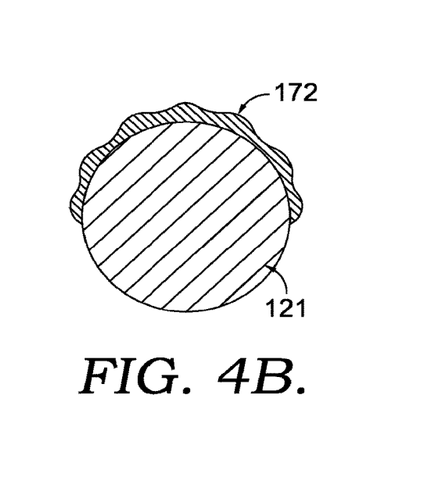
FIG. 4B depicts a cross section view of a ring having residual material thereon, in accordance with aspects hereof.

FIG. 4B depicts an exemplary cross section of the third ring 121 having residual material 172, in accordance with aspects hereof. As depicted in FIG. 4B, the residual material 172 is deposited on an exterior hemisphere; however, the residual material may extend around to a second hemisphere (e.g., an interior-facing surface). Further, the relative size and thickness of the residual material 172 as compared to the third ring 121 is illustrative only and not representative of an actual accumulation amount in all aspects.

Figure 5:
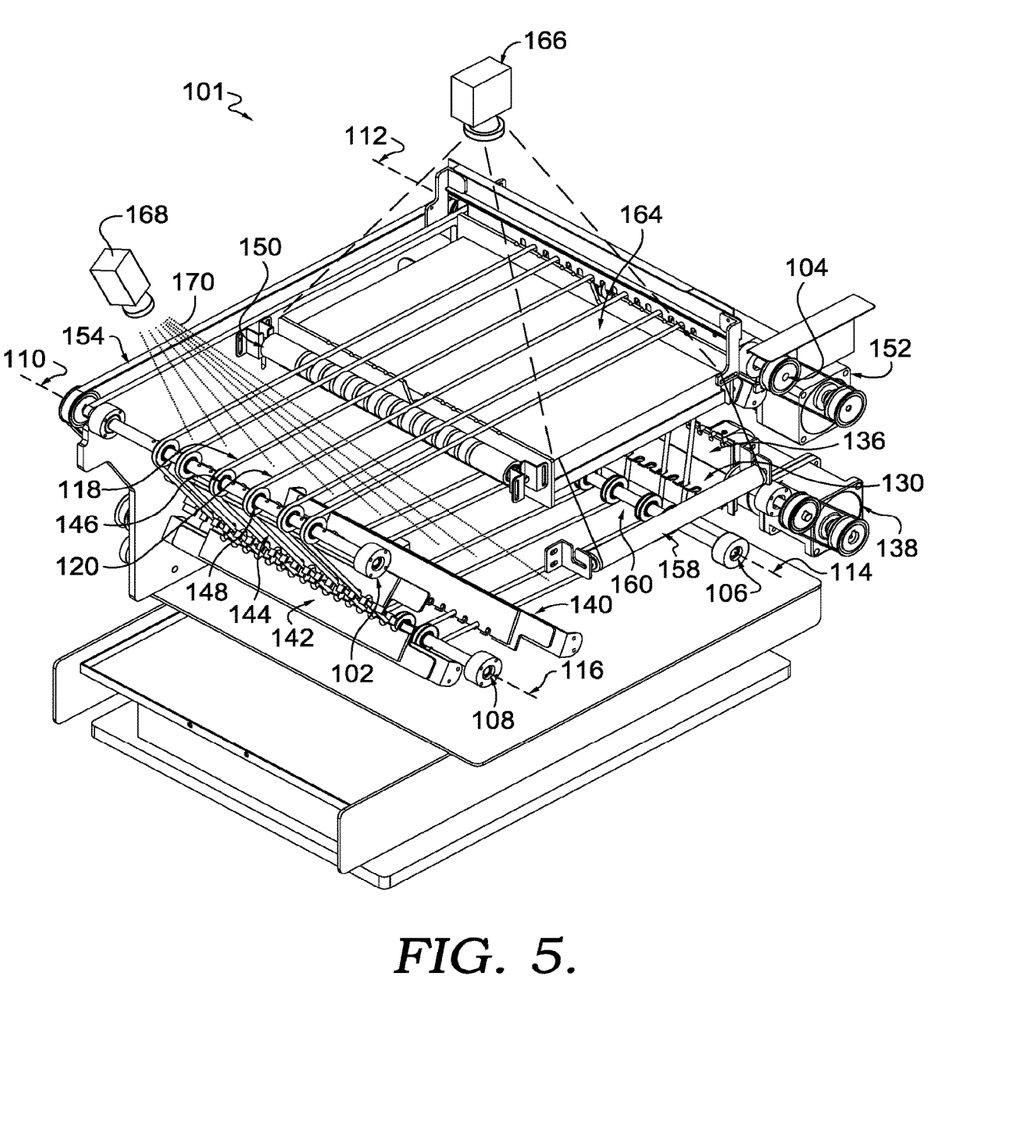
FIG. 5 depicts an alternative ring conveyor with a plurality of scrapers, in accordance with aspects hereof.

FIG. 5 depicts an alternative self-cleaning conveyor 101, in accordance with aspects hereof. The plurality of rings, inclusive of the first ring 118 and the second ring 120, extend around a combination of the first roller 102, the second roller 104, a third roller 106, and a fourth roller 108. The third roller 106 has a third rotational axis 114 and the fourth roller 108 has a fourth rotational axis 116. Each of the rollers is positioned such that their respective rotational axes are parallel. The plurality of rings may be positioned on pulleys (e.g., the first pulley 146, the second pulley 148) associated with each of the rollers to guide positioning of the rings during conveyance motion.

The conveyor 101 is comprised of multiple scrapers. The first scraper 130 is part of a rotating scraper assembly 136, as more clearly depicted in FIGS. 9 and 10 hereinafter. The rotating scraper assembly 136 is comprised of a plurality of scrapers, which may be identical to the first scraper 130. The rotating scraper assembly 136 is able to rotate a different scraper into a scraping position with the plurality of rings. The rotating scraper assembly 136 allows for a changing of the scraper that engages with the rings through rotational movement of the assembly. As the first scraper 130 is an initial scraper to encounter residual material on the ring(s), the first scraper 130 may become burdened with residual material at a faster rate than subsequent scrapers in the direction of rotation of the rings. Therefore, the initial scraper, the first scraper 130, may rotate to expose a fresh scraper of the rotating scraper assembly to the rings for a more (or continued) effective initial scraping. Therefore, in use, it is contemplated that the rotating scraper assembly 136 rotates the first scraper 130 from a first configuration where the plurality of rings pass through respective scraper slots to a second configuration where the first scraper 130 is not engaged with the plurality of rings. The second configuration of the rotating scraper assembly 136 allows for another of a plurality of scrapers of the rotating scraper assembly 136 to engage with and clean the plurality of rings. Rotation of the rotating scraper assembly 136 may be accomplished through any mechanism, such as a rotating scraper power source 138. The rotating scraper power source 138 may be an electric motor, a hydraulic drive, or the like. Alternatively, the drive source 152 mat be operatively coupled to the rotating scraper assembly 136 to drive the rotation.

The rotating scraper assembly 136 may continuously rotate either in a direction against the rotation of the plurality of rings or in a direction with the rotation of the plurality of rings. Regardless of a direction of rotation for the rotating scraper assembly 136, the rotating scraper assembly 136 may continuous rotate or it may rotate at specific times, such as when the plurality of rings are not moving or when material (e.g., adhesive) is not being applied toward the rings.

The first scraper 130 is positioned on the exterior side of the plurality of rings and the second scraper 140 is positioned on the interior side of the plurality of rings. As such, the first scraper 130 scrapes a first portion (e.g., an exterior hemisphere of the cross section) while the second scraper 140 scrapes a second portion (e.g., an interior hemisphere of the cross section). It is contemplated that the first scraper 130 and the second scraper 140 are formed with a similar material composition (e.g., rubber) to provide a similar cleaning experience to an exterior side (e.g., the first scraper 130) and an interior surface (e.g., the second scraper 140) through use of a common material forming a ring-contacting surface of the scraper.

The third scraper 142 and the fourth scraper 144 are contemplated as being formed with a similar material composition at least at a ring-contacting portion. For example, the third scraper 142 and the fourth scraper 144 may be formed having a material composition that is effective to further clean any residual material from the ring not previously cleaned by prior scrapers. For example, the third scraper 142 and the fourth scraper 144 may be formed having a flexible or rigid material having one or more coatings, such as a non-stick coating like a polytetrafluoroethylene material composition. The non-stick coating is effective to prevent accumulation of residual material particulate on the scraper that has been removed from one or more of the rings. The third scraper 142 and the fourth scraper 144 may be positioned on opposite side of the ring(s), as depicted in FIGS. 5-8. This opposite positioning allows for alternative surfaces to be cleaned on the ring by the different scrapes. For example, the third scraper 142 may be effective to clean the exterior facing surface 126 of the ring(s) and the fourth scraper 144 may be effective to clean the interior facing surface 128 of the ring(s).

The plurality of rings 122 are driven to cause a conveyance of a component maintained thereon. The drive of the plurality of rings 122 is from the drive source 152 operatively coupled with one or more of the rollers about which the plurality of rings 122 surround. As depicted in FIG. 5, the drive source 152 is operatively coupled with the second roller 104 by way of a belt. This operative coupling transfers rotational energy from the drive source 152 to the second roller 104. The rotation of the second roller 104 is transferred to the other rollers by way of the common coupling 154. The common coupling 154 transfers rotational energy between one or more elements, such as from the second roller 104 to the first roller 102, the third roller 106, and the fourth roller 108. Having multiple rollers about which the ring(s) surround cooperatively coupled for rotational energy conveyance limits slip or other discrepancy between two or more rings. For example, as a scraper contacts residual material on a ring, the scraping activity resists the motion of the ring and could cause a reduced speed of the ring relative to the other rings. Having multiple rollers effective to rotate the ring(s) increases points of rotational energy transfer to the ring(s) to counteract resistance of the rings to movement by the scrapers.

A supporting roller 150 is provided. The supporting roller 150 is optionally provided in the plane of conveyance of a component, such as an article of footwear component. The supporting roller 150 provides vertical support to the plurality of rings 122 as they convey the component through a processing step. In addition to vertical support, the supporting roller 150 may aid in stabilizing the plurality of rings 122 to prevent or reduce unintended movement of the plurality of rings 122 as they convey a component. For example, a vision system 166 comprised of a camera may capture images of the components to ensure appropriate coverage of applied material, identify a position of the component, and/or identify the component type/size/model. The vision system 166 may be used in combination with a light surface 164. The light surface 164 is positioned on an interior side of the plurality of rings 122 while the vision system 166 is positioned on an exterior side of the plurality of rings 122. The relative position of the light surface 164 and the vision system 166 allows for a silhouette of the component to be captured by the vision system 166. For example, the light surface 164 may emit a diffused light pattern upwards toward the vision system 166. The diffused light pattern passes through the plurality of rings 122 and the conveyed component on the way to the vision system 166. This light pattern is useful to create a contrast, regardless of component coloration, between the light surface 164 and the conveyed component.

The supporting roller 150 limits movement of the plurality of rings 122 in the transverse and the vertical direction. Limiting movement aids in the vision system 166 capture of images. Further, the plurality of rings 122 may be formed from a material, such as silicone, that effectively diffracts the light pattern with minimal obstruction to the vision system 166. This is in contrast to other materials (e.g., metallic materials) that may form the plurality of rings 122, which may reflect or otherwise distort the image capture from the vision system 166 as a result of their interaction with the light pattern.

The light surface 164 may be positioned at any location and it may be optional all together. The light surface 164 may be a light-emitting diode, incandescent, or other technology to develop and emit light energy, which may be in the visible or other spectrum (e.g., infrared, ultraviolet). The light surface 164 may be continuously active (e.g., emitting light) or selectively active (e.g., when an image is being captured by the vision system 166). The light source may emit light in various ranges of a spectrum (e.g., colors). The light surface 164 may be omitted in some aspects.

A protective film 160, such as a light transmissive polymer material (e.g., polymer wrap), may be positioned between the light surface 164 and the plurality of rings 122 to provide a serviceable protective surface for the light surface 164. For example, residual material may pass through the plurality of rings 122, from the conveyed component, or from the plurality of rings 122 towards the light surface 164. The film 160 may serve as a sacrificial surface for catching the residual material to prevent the residual material from obscuring the light surface 164. The film 160 may be dispensed from a film source (not depicted) and collected at a film roller 158. The film 160 may be advanced in a direction of travel perpendicular to the direction of travel for the plurality of ring 122. The film 160 may be advanced continuously or selectively. Selective advancement may be in response to a sensed obscuring of the light pattern by the vision system 166. Selective advancement may be in response to application of material to a component. Selective advancement may be in response to a passage of a predefined time (e.g., 30 second, 1 minute, 5 minutes). Selective advancement may be a manual input from an operator.

The also depicted in connection with the self-cleaning conveyor 101 is a material applicator 168. The material applicator 168 may be any material applicator, such as a spray applicator, a drip applicator, a brush applicator, and the like. In an exemplary aspect, the material applicator 168 is effective to spray a material 170, such as an adhesive. The material applicator 168 may be positioned at any location relative to the self-cleaning conveyor 101. In an exemplary aspect, the material applicator 168 is positioned in the direction of travel prior to the supporting roller 150. In an alternative aspect, the material applicator 168 is positioned in the direction of travel after the supporting roller 150. In yet another exemplary aspect, the material applicator 168 is positioned to apply material at least at the supporting roller 150. In an exemplary aspect, the material applicator 168 is positioned in the direction of travel prior to the light surface 164. In yet another exemplary aspect, the material applicator 168 is positioned to apply material at least at the light surface 164.

The material applicator 168 may continuously apply material, such as a constant spray, or it may selectively apply material. The selective application of the material may be controlled, at least in part, by the vision system 166. Further, aspects contemplated the material applicator 168 coupled with a conveyance mechanism, such as a robotic arm. The conveyance mechanism is effective to position the material applicator 168 appropriately relative to a component to apply material to the component. Further, it is contemplated that the material applicator 168 may be statically positioned and have an effective coverage area to apply material to a component positioned on the self-cleaning conveyor 101.

While not depicted, it is contemplated that one or more conveyance mechanisms may precede and/or follow the self-cleaning conveyor 101. For example, a conveyor may deposit the components on the plurality of rings 122 above the first roller 102. The components may then be conveyed by the plurality of ring 122 to have material applied by the material applicator 168. The components having material applied thereon may then be inspected with a vision system 166 and the light surface 164 to ensure appropriate coverage is provided. The components may then continue to be conveyed in a direction of travel towards the second roller 104. Following the second roller 104, the components may be conveyed by another conveyance mechanism, such as another conveyor belt. In aspects contemplated, the material applied by the material applicator 168, such as an adhesive, may be sufficiently cured or in a state that limits residual material from being transferred to a downstream conveyance mechanism by the time the component is conveyed to the second roller 104.

The self-cleaning conveyor 101 as illustrated herein is exemplary in nature and is not limiting in scope. For example, while the plurality of rings 122 is depicted having 6 distinct rings, it is understood that any number of rings may be implemented. Further, it is contemplated that the size and relative positioning of the rings forming the plurality of rings 122 is exemplary illustrated and not limiting. Furthermore, the body or case has been removed or simplified to provide an internal and more complete perspective of the self-cleaning conveyor 101 in FIG. 5. Alternative and additional elements are therefore contemplated to complete the self-cleaning conveyor 101 and supporting structure.

Figure 6:
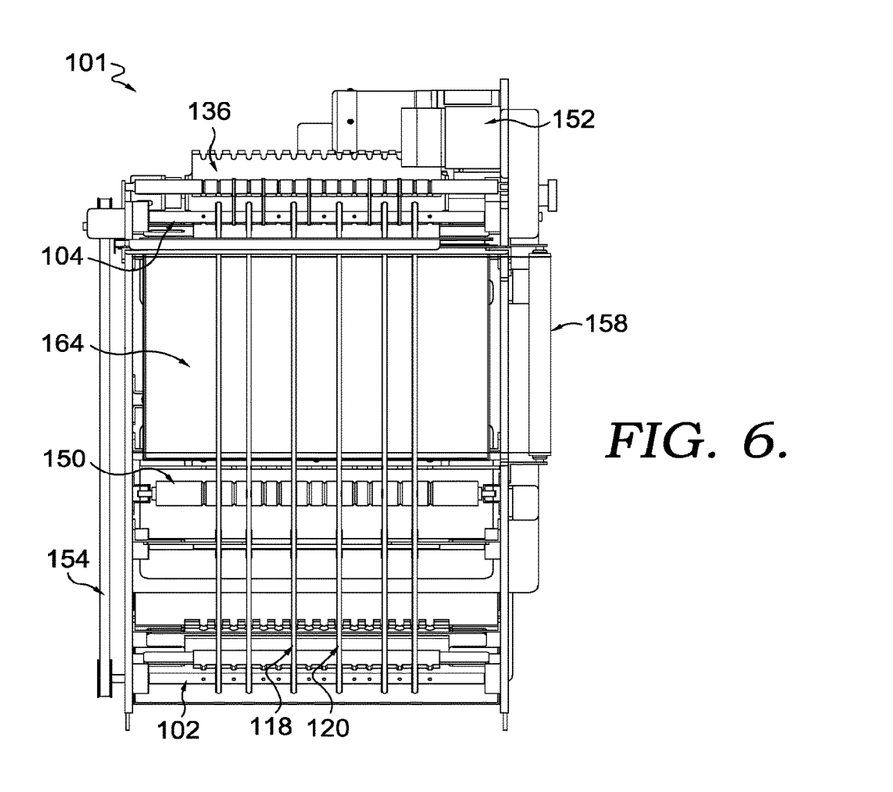
FIG. 6 depicts a top view of the ring conveyor of FIG. 5, in accordance with aspects hereof.

FIG. 6 depicts a top view of the self-cleaning conveyor 101 from FIG. 5, in accordance with aspects hereof.

Figure 7:
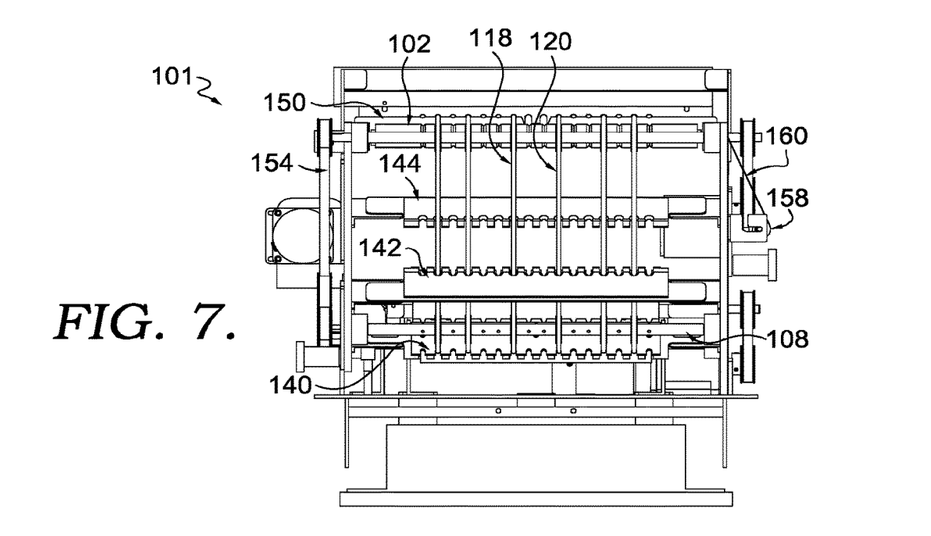
FIG. 7 depicts a front view of the ring conveyor of FIG. 5, in accordance with aspects hereof.

FIG. 7 depicts a front view of the self-cleaning conveyor 101 from FIG. 5, in accordance with aspects hereof.

Figure 8:
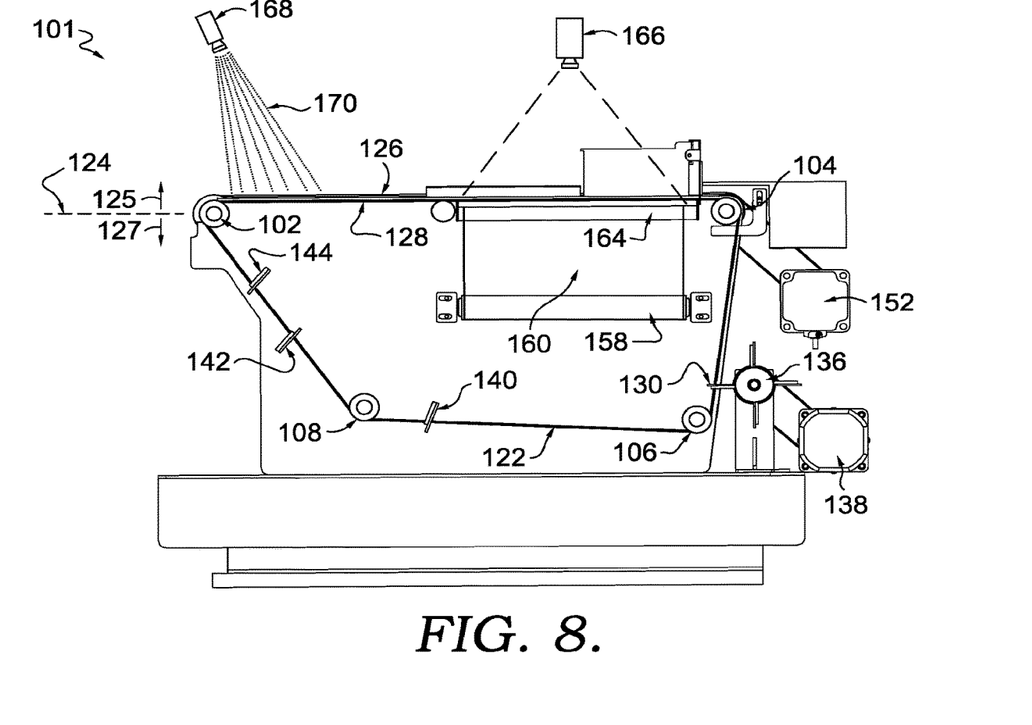
FIG. 8 depicts a side view of the ring conveyor of FIG. 5, in accordance with aspects hereof.

FIG. 8 depicts a side view of the self-cleaning conveyor 101 from FIG. 5, in accordance with aspects hereof. As seen in FIG. 8, the first scraper 130 and the third scraper 142 are on the exterior facing surface 126 of the plurality of rings 122, while the second scraper 140 and the fourth scraper 144 are on the interior facing surface 128 of the plurality of rings 122. In an exemplary aspect, the first scraper 130 and the second scraper 140 work in cooperation to clean the plurality of rings 122 with a first material composition. The third scraper 142 and the fourth scraper 144 work in cooperation to clean the plurality of rings 122 with a second material composition.

Figures 9, 10:
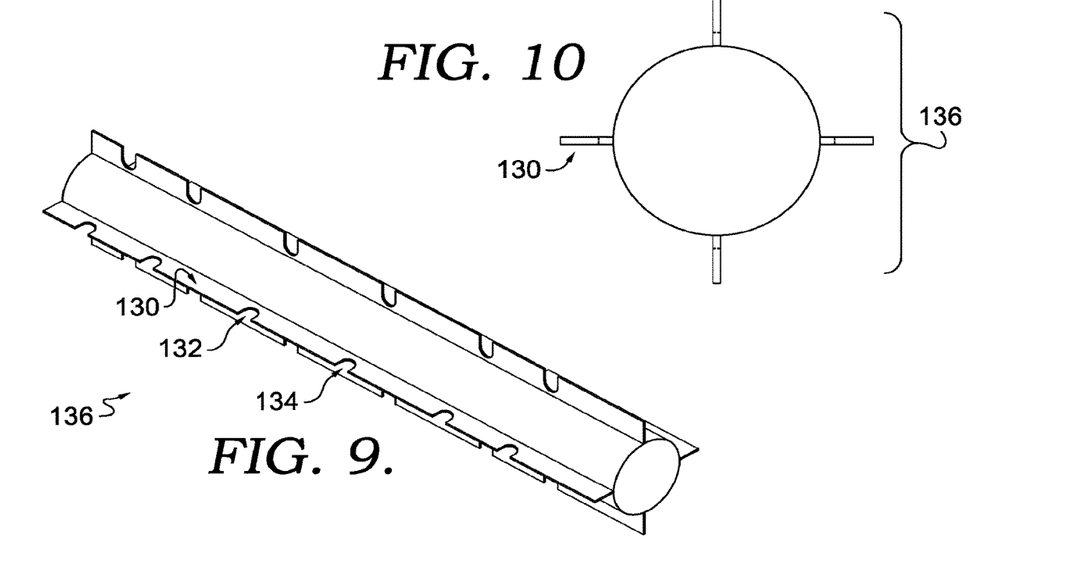
FIG. 9 depicts a perspective view of a scraper assembly, in accordance with aspects hereof.
FIG. 10 depicts a side view of the scraper assembly from FIG. 10, in accordance with aspects hereof.

FIG. 9 depicts a perspective view of the rotating scraper assembly 136, in accordance with aspects hereof. FIG. 10 depicts a side view of the rotating scraper assembly 136, in accordance with aspects hereof. As seen, therefore, in FIGS. 8-10, the rotating scraper assembly is comprised of a plurality of scrapers that can serve as the first scraper 130. The rotating scraper assembly 136 may be comprised of any number of discrete scrapers, such as 2, 3, 4, 5, or 6. In the aspects illustrated, the rotating scraper assembly 136 is comprised of four scrapers that may be positioned to engage with residual material on the plurality of rings 122. Each of the individual scrapers of the rotating scraper assembly 136 may have a plurality of scraping slots that are aligned such that as the rotating scraper assembly 136 rotates, subsequently engaging scrapers align with and appropriately engage with the plurality of rings 122. This alignment between scrapers on the rotating scraper assembly 136 is depicted in FIG. 9, for example. The first scraping slot 132 aligns with a counterpart scraping on the other scrapers depicted. The corresponding scraping slots of each scraper on the rotating scraper assembly 136 may have a similar size and shape in a first aspect. It is also contemplated that the rotating scraper assembly 136 may include scrapers having different sized and/or shaped scraping slots at corresponding scraping slots of different scrapers. This variation in scraping slot configuration allows the rotating scraper assembly 136 to adjust to a residual material characteristic (e.g., viscosity, amount, type) by rotating different scrapers into an engaging position with the plurality of rings 122.

Figure 11:
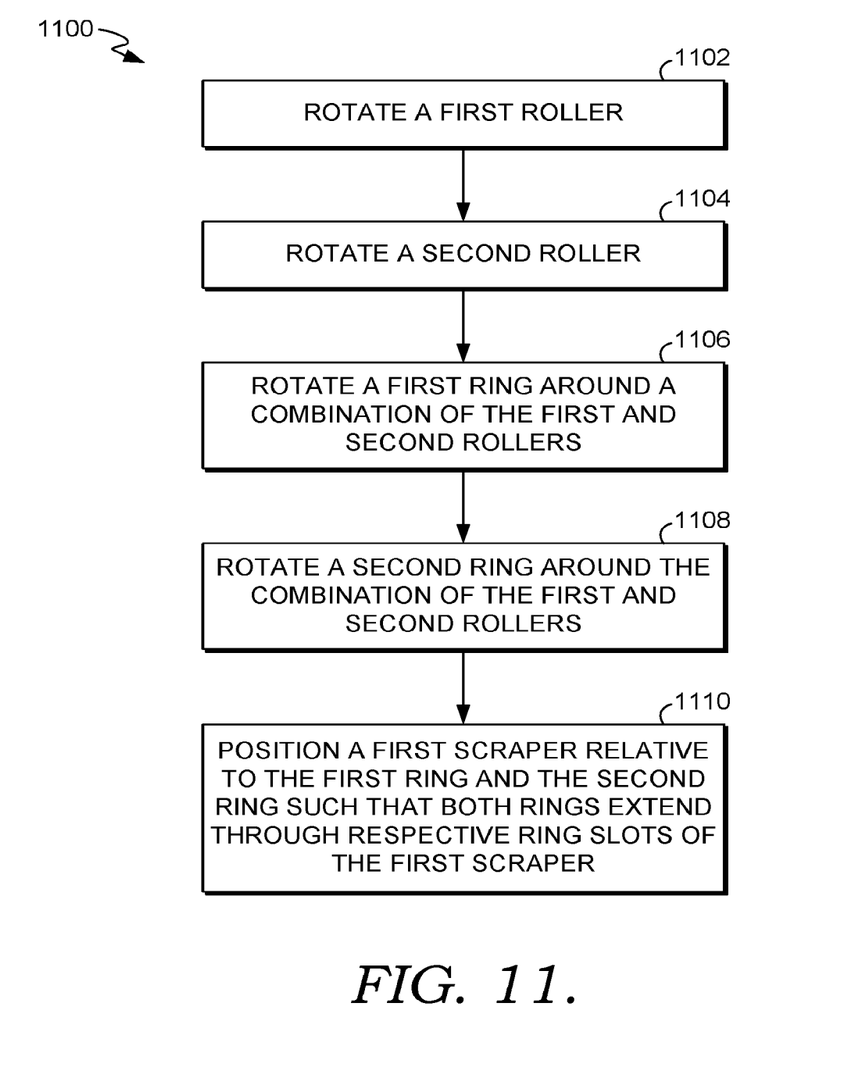
FIG. 11 depicts a flow chart illustrating an exemplary method operating a self-cleaning ring conveyor, in accordance with aspects hereof.

FIG. 11 depicts a flow diagram 1100 representing a method of cleaning a ring conveyor, in accordance with aspects hereof. At a block 1102 a first roller is rotated, such as the first roller 102 of FIGS. 1 and 5. At a block 1104, a second roller is rotated, such as the second roller 104 of FIGS. 1 and 5. The first roller and the second roller may be rotated by a common drive source that is operatively coupled to each roller through a common coupling. Alternatively, the drive source may be operatively coupled with one of the first roller or the second roller to cause the roller to which it is operatively coupled to rotate. The second roller rotates as a result of one or more rings that extend around the combination of rollers transferring the drive energy from the operatively coupled roller to the other roller. Further, it is contemplated that independent drive sources may cause each roller to rotate, in an exemplary aspect. Rotation of the first roller and the second roller in the blocks 1102 and 1104 allow for a plurality of rings to be driven through and/or past one or more scrapers to remove residual material therefrom.

At a block 1106 a first ring, such as the first ring 118 of FIGS. 1 and 5, is rotated (i.e., conveyed in a direction of travel) around a combination of the first roller and the second roller. At a block 1106 a second ring is rotated around the combination of the first roller and the second roller. A combination of roller is to be constructed as a comprising of the first and second rollers. Therefore the combination of the first and second rollers may include additional rollers. For example, FIG. 1 shoes the first ring and the second ring rotating around a combination of a first roller and a second roller, where the combination consists exclusively of those two rollers. FIG. 5 also depicts the first ring and the second ring rotating around a first roller and a second roller, but the combination of rollers in FIG. 5 also includes at least a third roller and a fourth roller. The rotation of a ring around a combination of rollers is the movement of the ring in a direction of travel as driven by one or more rollers. This rotation of the ring serves to form a conveyance surface on to which a component, such as an article, may be placed and conveyed. Further, as provided herein, it is contemplated that one or more rings engage with a roller through a pulley. The pulley is effective to maintain a ring in an intended portion as well as to provide a specified diameter about which the ring travels, which may be greater than a diameter of the roller. The pulley diameter may be adjusted to provide a ring offset from one or more elements by raising a plane represented by the ring extending between the first and second rollers in a direction of travel.

The rotation of the rings may be accomplished through a transfer of rotational energy from one or more roller that are rotating to the rings directly or through a pulley. The rotation of the rings may be synchronized such that the speed of rotation for one ring is matched by another ring. Thus synchronization, in an exemplary aspect, is accomplished through the two or more rings being placed in tension around the combination of rollers such that as a roller rotates, all of the rings extending around the combination of rollers including the rotating roller cause all rings to uniformly rotate. A uniform rotation of the rings allows for consistent conveyance of the component that is supported by two or more rings. Further, as a scraper scrapes residual material from a ring, the scraping action introduces resistance into the rotation of the rings. Having the rings tensioned around a combination of rollers, each ring may be driven at each roller by at least the rotation of the other rings also tensioned around the same combination of rollers.

At a block 1110 a first scraper is positioned relative to the first ring and the second ring such that both rings extend through respective ring slots, such as scraper slots of the first scraper. The positioning of the first scraper may include adjusting a position or portion of the first scraper to appropriately scrape residual material from the rings. The positioning of the first scraper may include rotating a rotating scraper assembly to position a scraper at an appropriate location to effectively scrape residual material from one or more rings. In aspects, the positioning of the first scraper includes causing one or more rings to move through respective scraper slots of the first scraper. The movement of the rings through the first scraper is accomplished through the rotation of the rings around the combination of rollers with one or more of the rollers being driven by a drive source.

LISTING OF FEATURES

Ring conveyor—100
First roller—102
Second roller—104
Third roller—106
Fourth roller—108
First rotational axis—110
Second rotational axis—112
Third rotational axis—114
Fourth rotational axis—116
First ring—118
Diameter—119
Second ring—120
Third ring—121
Plurality of rings—122
Plane—124
First side—125
Exterior facing surface—126
Second side—127
Interior facing surface—128

First scraper—130
First scraping slot—132
Second scraping slot—134
Rotating scraper assembly—136
Rotating scraper power source—138
Second scraper—140
Third scraper—142
Fourth scraper—144
First pulley—146
Second pulley—148
Supporting roller—150
Drive source—152
Common coupling—154
Film roller—158
Film—160
Direction of travel—162
Light surface—164
Vision system—166
Material applicator—168
Material—170
Residual material—172

The following are example clauses representing aspects contemplated herein.

1. A self-cleaning ring conveyor comprising: a first roller having a first rotational axis; a second roller having a second rotational axis that is parallel with the first rotational axis; a first ring extending around a combination of the first roller and the second roller; a second ring extending around the combination of the first roller and the second roller, wherein the first ring and the second ring are parallel; and a first scraper, the first scraper having a first scraping slot and a second scraping slot, wherein the first ring extends through the first scraping slot and the second ring extends through the second scraping slot.

2. The self-cleaning ring conveyor of clause 1, wherein the first roller is comprised of a first pulley about which the first ring extends and the first roller is further comprised of a second pulley about which the second ring extends.

3. The self-cleaning ring conveyor of clause 1, wherein at least one of the first roller or the second roller is operatively coupled with a drive source.

4. The self-cleaning ring conveyor of clause 1, wherein the first ring has a cross-sectional diameter in a range of 4 mm to 10 mm.

5. The self-cleaning ring conveyor of clause 4, wherein the first ring is formed from a composition comprised of silicone.

6. The self-cleaning ring conveyor of clause 1, wherein the first ring is physically separate from the second ring.

7. The self-cleaning ring conveyor of clause 1, wherein the first ring and the second ring are of a plurality of three or more parallel rings positioned around the combination of at least the first roller and the second roller.

8. The self-cleaning ring conveyor of clause 1, wherein the first scraper is one of a plurality of scrapers on a rotatable axis allowing the first scraper to be rotated from a first configuration with the first ring extending through the first scraping slot and the second ring extending through the second scraping slot to a second configuration with the first ring extending through a scraping slot of another of the plurality of scrapers.

9. The self-cleaning ring conveyor of clause 1 further comprising a second scraper, the second scraper configured to be positioned within 1 mm of the first ring and the second ring at a position subsequent in a direction of travel for the first ring from the first scraper.

10. The self-cleaning ring conveyor of clause 1 further comprising a supporting roller, the supporting roller positioned between the first roller and the second roller in a direction of travel of the first ring.

11. The self-cleaning ring conveyor of clause 1 further comprising a third roller having a third rotational axis that is parallel with the first rotational axis, and a fourth roller having a fourth rotational axis that is parallel with the first rotational axis, wherein first ring extends around a combination of the first roller, the second roller, the third roller, and the fourth roller.

12. The self-cleaning ring conveyor of clause 11, wherein the first scraper is positioned between the second roller and the third roller in a direction of travel of the first ring.

13. The self-cleaning ring conveyor of clause 12 further comprising a second scraper, a third scraper, and a fourth scraper, wherein the first and second scrapers are formed from a first material and the third and fourth scrapers are formed from a second material different from the first material.

14. The self-cleaning ring conveyor of clause 13, wherein the first scraper is positioned between the second roller and the third roller and positioned within 1 mm of the first ring, the second scraper is positioned between the third roller and the fourth roller and positioned within 1 mm of the first ring, and the third and fourth scrapers are positioned between the fourth roller and the first roller in a direction of travel of the first ring.

15. The self-cleaning ring conveyor of clause 13, wherein the first scraper contacts residual material on at least an exterior-facing surface of the first ring and the second scraper contacts residual material on at least an interior-facing surface of the first ring.

16. The self-cleaning ring conveyor of clause 11, wherein the first roller, the second roller, the third roller, and the fourth roller, are operatively coupled with a power source by a common coupling.

17. The self-cleaning ring conveyor of clause 1 further comprising a film roller, wherein the film roller has a rotational axes perpendicular to the first roller rotational axis, and wherein the film roller is positioned below a plane defined by the first ring and the second ring extending between the first roller and the second roller.

18. A system of applying material to a component on a self-cleaning ring conveyor, the system comprising: a self-cleaning ring conveyor comprising: a first roller having a first rotational axis; a second roller having a second rotational axis that is parallel with the first rotational axis; a first ring extending around a combination of the first roller and the second roller; a second ring extending around the combination of the first roller and the second roller, wherein the first ring and the second ring are parallel, wherein the first ring and the second ring define a plane between the first roller and the second roller; and a first scraper, the first scraper having a first scraping slot and a second scraping slot, wherein the first ring extends through the first scraping slot and the second ring extends through the second scraping slot; a light on a first side of the plane, wherein the light is configured to emit light through the plane to illuminate a component supported by the first ring and the second ring; a vision system, the vision system positioned on a second side of the plane, the vision system configured to capture an image of the component supported by the first ring and the second ring illuminated by the light; and a material applicator, the material applicator positioned on the second side of the plane and configured to apply material to the component supported by the first ring and the second ring.

19. A method of cleaning a ring conveyor, the method comprising: rotating a first roller having a first rotational axis; rotating a second roller having a second rotational axis that is parallel with the first rotational axis; rotating a first ring extending around a combination of the first roller and the second roller; rotating a second ring extending around the combination of the first roller and the second roller, wherein the first ring and the second ring are parallel; and positioning a first scraper relative to the first ring and the second ring, the first scraper having a first scraping slot and a second scraping slot, wherein the first ring extends through the first scraping slot and the second ring extends through the second scraping slot.

20. The method of clause 19 further comprising: rotating a third roller having a third rotational axis that is parallel with the first rotational axis; rotating a fourth roller having a fourth rotational axis that is parallel with the first rotational axis, wherein first ring extends around a combination of first roller, the second roller the third roller, and the fourth roller; and scraping the first ring and the second ring with a second scraper, a third scraper, and a fourth scraper as the first ring and the second ring rotate around the combination of the first roller, the second roller, the third roller, and the fourth roller.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A self-cleaning ring conveyor comprising:
a first roller having a first rotational axis;
a second roller having a second rotational axis that is parallel with the first rotational axis;
a first ring extending around a combination of the first roller and the second roller;
a second ring extending around the combination of the first roller and the second roller, wherein the first ring and the second ring are parallel; and
a first scraper, the first scraper having a first scraping slot that is a non-linear edge of the first scrapper and a second scraping slot that is a non-linear edge of the first scrapper, wherein the first ring extends through the first scraping slot and the second ring extends through the second scraping slot.

2. The self-cleaning ring conveyor of claim 1, wherein the first roller comprises a first pulley about which the first ring extends and the first roller comprises a second pulley about which the second ring extends.

3. The self-cleaning ring conveyor of claim 1, wherein at least one of the first roller or the second roller is operatively coupled with a drive source.

4. The self-cleaning ring conveyor of claim 1, wherein the first ring has a cross-sectional diameter in a range of 4 mm to 10 mm.

5. The self-cleaning ring conveyor of claim 4, wherein the first ring is formed from a composition comprised of silicone.

6. The self-cleaning ring conveyor of claim 1, wherein the first ring is physically separate from the second ring.

7. The self-cleaning ring conveyor of claim 1, wherein the first ring and the second ring are of a plurality of three or more parallel rings positioned around the combination of at least the first roller and the second roller.

8. The self-cleaning ring conveyor of claim 1, wherein the first scraper is one of a plurality of scrapers on a rotatable axis allowing the first scraper to be rotated from a first configuration with the first ring extending through the first scraping slot and the second ring extending through the second scraping slot to a second configuration with the first ring extending through a scraping slot of another of the plurality of scrapers.

9. The self-cleaning ring conveyor of claim 1 further comprising a second scraper, the second scraper configured to be positioned within 1 mm of the first ring and the second ring at a position subsequent in a direction of travel for the first ring from the first scraper.

10. The self-cleaning ring conveyor of claim 1 further comprising a supporting roller, the supporting roller positioned between the first roller and the second roller in a direction of travel of the first ring.

11. The self-cleaning ring conveyor of claim 1 further comprising a third roller having a third rotational axis that is parallel with the first rotational axis, and a fourth roller having a fourth rotational axis that is parallel with the first rotational axis, wherein first ring extends around a combination of the first roller, the second roller, the third roller, and the fourth roller.

12. The self-cleaning ring conveyor of claim 11, wherein the first scraper is positioned between the second roller and the third roller in a direction of travel of the first ring.

13. The self-cleaning ring conveyor of claim 12 further comprising a second scraper, a third scraper, and a fourth scraper, wherein the first and second scrapers are formed from a first material and the third and fourth scrapers are formed from a second material different from the first material.

14. The self-cleaning ring conveyor of claim 13, wherein the first scraper is positioned between the second roller and the third roller and positioned within 1 mm of the first ring, the second scraper is positioned between the third roller and the fourth roller and positioned within 1 mm of the first ring, and the third and fourth scrapers are positioned between the fourth roller and the first roller in a direction of travel of the first ring.

15. The self-cleaning ring conveyor of claim 13, wherein the first scraper contacts residual material on at least an exterior-facing surface of the first ring and the second scraper contacts residual material on at least an interior-facing surface of the first ring.

16. The self-cleaning ring conveyor of claim 11, wherein the first roller, the second roller, the third roller, and the fourth roller, are operatively coupled with a power source by a common coupling.

17. The self-cleaning ring conveyor of claim 1 further comprising a film roller, wherein the film roller has a rotational axes perpendicular to the first roller rotational axis, and wherein the film roller is positioned below a plane defined by the first ring and the second ring extending between the first roller and the second roller.

18. A system of applying material to a component on a self-cleaning ring conveyor, the system comprising:

a self-cleaning ring conveyor comprising:
- a first roller having a first rotational axis;
- a second roller having a second rotational axis that is parallel with the first rotational axis;
- a first ring extending around a combination of the first roller and the second roller;
- a second ring extending around the combination of the first roller and the second roller, wherein the first ring and the second ring are parallel, wherein the first ring and the second ring define a plane between the first roller and the second roller; and
- a first scraper, the first scraper having a first scraping slot and a second scraping slot, wherein the first ring extends through the first scraping slot and the second ring extends through the second scraping slot;

a light on a first side of the plane, wherein the light is configured to emit light through the plane to illuminate a component supported by the first ring and the second ring;

a vision system, the vision system positioned on a second side of the plane, the vision system configured to capture an image of the component supported by the first ring and the second ring illuminated by the light; and a material applicator, the material applicator positioned on the second side of the plane and configured to apply material to the component supported by the first ring and the second ring.

19. A method of cleaning a ring conveyor, the method comprising:
- rotating a first roller having a first rotational axis;
- rotating a second roller having a second rotational axis that is parallel with the first rotational axis;
- rotating a first ring extending around a combination of the first roller and the second roller;
- rotating a second ring extending around the combination of the first roller and the second roller, wherein the first ring and the second ring are parallel; and
- positioning a first scraper relative to the first ring and the second ring, the first scraper having a first scraping slot and a second scraping slot, wherein the first ring extends through the first scraping slot and the second ring extends through the second scraping slot.

20. The method of claim 19 further comprising:
- rotating a third roller having a third rotational axis that is parallel with the first rotational axis;
- rotating a fourth roller having a fourth rotational axis that is parallel with the first rotational axis, wherein first ring extends around a combination of first roller, the second roller the third roller, and the fourth roller; and
- scraping the first ring and the second ring with a second scraper, a third scraper, and a fourth scraper as the first ring and the second ring rotate around the combination of the first roller, the second roller, the third roller, and the fourth roller.

* * * * *